Nov. 21, 1950          T. C. HILL          2,530,659
AIRCRAFT BOOSTER CONTROL SYSTEM
Filed March 23, 1946          2 Sheets-Sheet 1
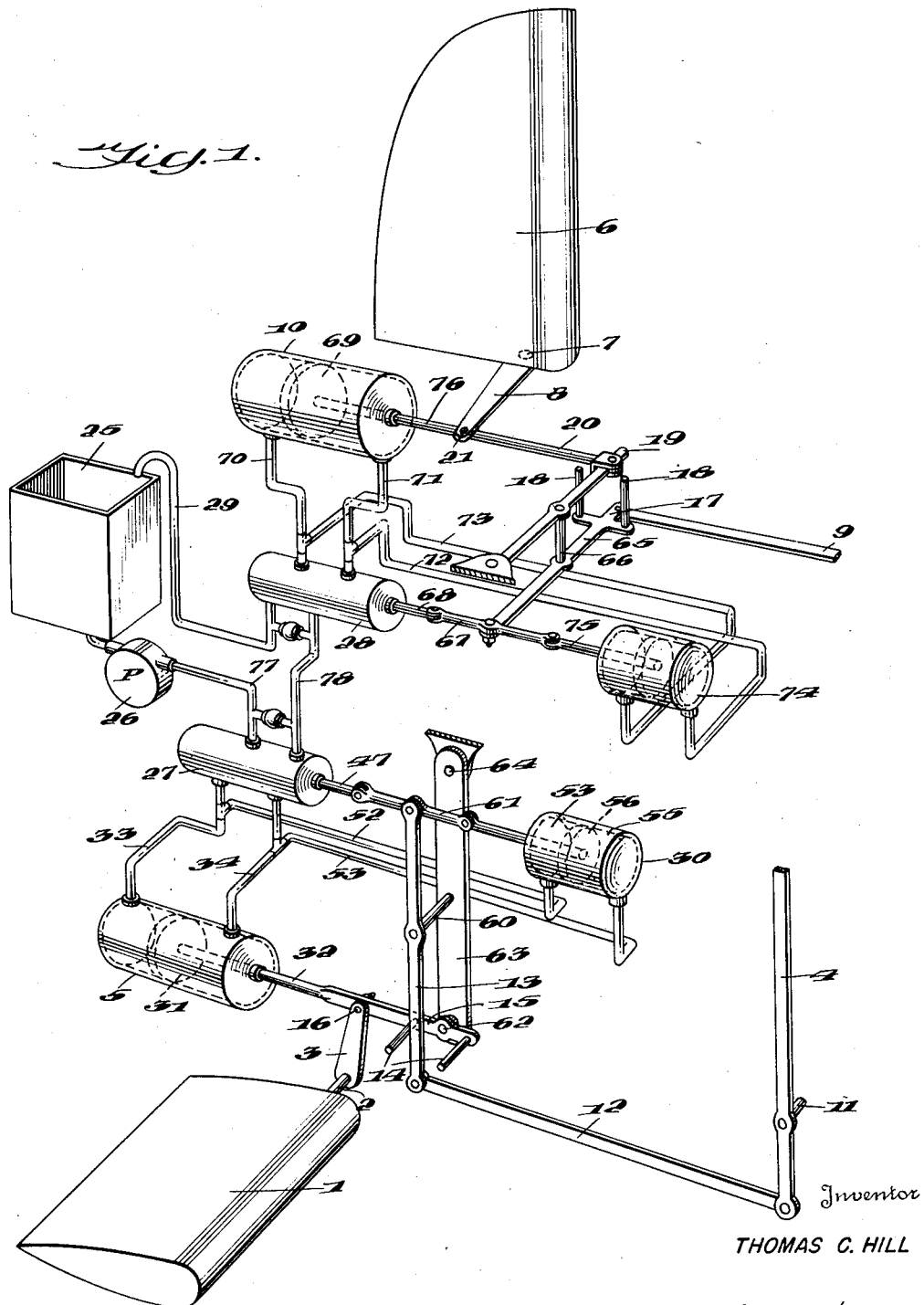
Inventor
THOMAS C. HILL
By Donald W. Tarrington
Attorney

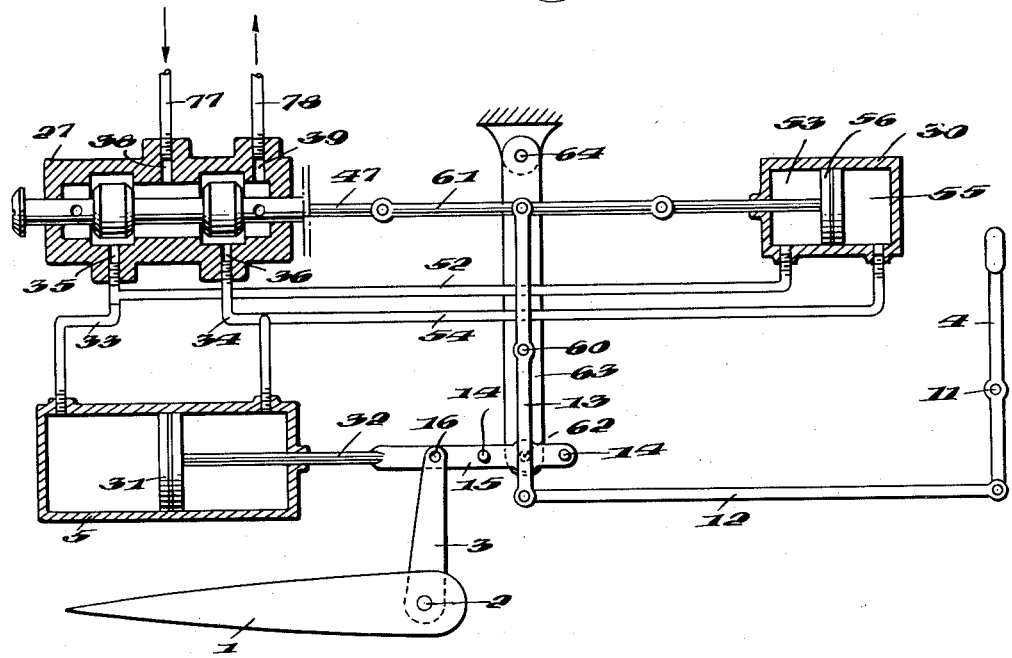

Patented Nov. 21, 1950

2,530,659

UNITED STATES PATENT OFFICE 2,530,659

AIRCRAFT BOOSTER CONTROL SYSTEM

Thomas C. Hill, Parkville, Md., assignor to The Glenn L. Martin Company, Middle River, Md., a corporation of Maryland Application March 23, 1946, Serial No. 656,611

8 Claims. (Cl. 244—85)

This invention relates to a booster control system to assist the pilot in operating the controls of an aircraft subjected to large loads. The system can be used to advantage on aileron controls or on rudders and elevators, separately or in series.

The controls subject to the greatest aerodynamic load that the pilot must operate are the elevators and rudder or rudders. In large aircraft, it is almost impossible for the pilot to exert enough force on the control column or rudder pedals to directly operate the elevator or rudder. Many devices have been tried and hydraulic boosting equipment has been employed but the greatest objection to hydraulic booster systems to date is that it has not been possible, with the usual hydraulic equipment including a source of pressure, control valves and double acting cylinders to get small increments of boost in the control system when required, with the proper indication of the force in a feel cylinder for the pilot's information as to what is happening at the controls, and to prevent vibration and chatter in such systems for such small increments of application of power. The chattering in the usual hydraulic booster system is due to the fact that high pressures are employed to operate the controls and due to the nature of the aerodynamic load on the control surfaces, it has been practically impossible to get control valves that do not have a sharp cut-off character so that when it is desired to apply small increments of power, any tendensy of the airfoil to vibrate seems to be aggravated by the control systems.

To overcome the above defects, the system of this invention employs, what is known as, an open center system or in other words a system of control valves which do not cut-off and release fluid under high pressure to the actuating cylinders.

By this invention a system is provided in which the fluid pressure to actuate the controls circulates at all times through the control system and is never shut off by valves, thereby preventing hydraulic ram effects in the control system.

Another object of this invention is the provision of a single hydraulic system including a reservoir and a pump to supply circulating hydraulic fluid under pressure through both the elevator and rudder systems.

Another object of this invention is the provision of a hydraulic booster control system in which the valves merely restrict the flow of fluid circulating through the system to actuate the booster cylinders but never cut-off the circulation of the fluid in the system.

Another object of this invention is the provision of a feel cylinder that is actuated in response to the fluid pressure in the actuating cylinder to advise the pilot of a proportionate amount of force exerted by the booster system.

Further and other objects will become apparent from the description of the accompanying drawings which form a part of this disclosure and in which like numerals refer to like parts.

In the drawings:

Figure 1 is a schematic arrangement of the booster system for elevator and rudder.

Figure 2 is a diagram in section showing the relation of the parts for either the elevator or the rudder.

Figure 3 is an enlarged sectional view showing the open center valve employed as a control valve.

The arrangement of the parts of the booster system for the elevator and rudder are shown more or less schematically in Figure 1. One elevator and one rudder are shown with one actuating cylinder on each control surface, but it is to be understood that the actuating cylinders may be employed in pairs for additional force and one or more elevators or rudders may be actuated with this booster control system. The elevator 1 is pivoted about shaft 2 and actuated by control horn 3. Elevator 1 is moved directly by control column 4 which force is supplemented from booster cylinder 5.

Rudder 6 is pivoted about axis 7 and moved by control horn 8. The rudder is moved by the rudder pedals through linkage 9 and additional force to move this airfoil is supplied by power cylinder 10. Control column 4 moves about pivot 11 and through linkage 12 and lever 13 and will move elevator 1 as the control column causes lever 13 to contact either of stops 14. Stops 14 are mounted on linkage 15 to which control horn 3 is pivoted as at 16. Control column 4, therefore, can move elevator 1 in the absence of hydraulic lock in cylinder 5.

In a similar manner, linkage 9 will be moved by the rudder pedals which moves lever 17. Stops 18, secured to lever 17, will move lever 19 and linkage 20 to which control horn 8 is pivoted as at 21.

The hydraulic booster system includes reservoir 25 and pump 26 to force hydraulic fluid through valves 27 and 28 and it will be noted that the same hydraulic pump and reservoir supplies the fluid under pressure to actuate both the elevator and rudder booster control systems. The operation of the booster control system for the elevator or the rudder is substantially the same and can most easily be followed upon the diagrammatic sketch of Figure 2 showing just the booster system for the elevator.

Figure 2 shows, in addition to the elements recited above for the elevator control, sectional views of booster cylinder 5, valve 27 and feel cylinder 30. Booster cylinder 5 includes a piston 31 and piston rod 32 and is connected to pivot 16 of control horn 3. Conduits 33 and 34 interconnect the chambers on each side of piston 31 in cylinder 5 with ports 35 and 36 of the flow control valve 27. Fluid flows from the pump into valve 27 at port 38 and leaves valve 27 at port 39. Valve 27 is a selector valve of the open center type. This valve is shown in more detail in Figure 3. Valve 27 is herein shown as having chambers 40, 41 and 42 of the same diameter and chambers 43 and 44 of enlarged diameter. Valve members 45 and 46 have chamfered faces and are supported in housing 27 by rod 47. This rod is drilled out for substantially its entire length within the valve to form a passage 48 therethrough, the outer end of which is closed by cap screw 49. Port 50 affords communication between chamber 40 and passage 48 and port 51 affords communication between chamber 42 and passage 48. It can be seen then from a consideration of Figures 2 and 3 that if fluid under pressure enters valve 27 at port 38, it is substantially unrestricted within valve 27 and the same flow and pressure leaves valve 27 by port 39. If rod 47 is moved to the left, it will be seen that the flow through the valve between ports 38 and 39 will be restricted by member 46 moving to close one end of chamber 41. Due to the chamfered edge of valve member 46 there is merely a restriction of the flow through the valve, not a complete cut-off of the flow through the valve. When the flow through the valve is thus restricted, pressure will be built up in chamber 41 and this pressure will be transmitted through port 35 and conduit 33 to one side of the piston 31 of the hydraulic cylinder 5. When rod 47 of valve 27 moves to the right the chamfered edges of valve members 45 and 46 will restrict the flow of fluid between chambers 43 and 41 and 44 and 42. Pressure will be built up in chamber 41 due to the restriction of flow between chambers 41, 44 and 42, which fluid pressure will be transmitted through port 36 and conduit 34 to the opposite side of piston 31 in cylinder 5 which will cause it to move to the left. The fluid displaced by piston 31 will flow through conduit 33 and port 35 to chamber 40 and then through port 50 through the open center of the valve, passage 48, out port 51 to chamber 42. From the above description of the valve it will be seen that in the neutral position the valve offers no restriction to the flow of fluid therethrough but can be actuated to cause fluid pressure to be applied to either side of the piston in the booster cylinder and also afford a free and open passage for fluid on the low pressure side of the piston through the open center valve. It will also be noted that for the manual control of the airfoil there is no possibility of hydraulic lock in cylinder 5 because fluid that is displaced by piston 31 can circulate freely through valve 27.

The increase in pressure on one side of the cylinder 31 creates a force on piston 31 that will cause it to move to the right. The fluid on the opposite side of piston 31 escapes through conduit 34, port 36, chamber 42 and port 39. Motion of piston 31 causes shaft 32 to move control horn 3 of elevator 1 through pivot 16. Thus, it will be seen that if the valve is moved to the left the elevator 1 will be moved upwardly. Under these conditions the flow of fluid does not cease through valve 27 but the differential in pressure on each side of piston 31 is obtained by throttling the flow of fluid between ports 38 and 39. The greater the throttling of the flow between these ports, the greater will be the differential in pressure built up on each side of piston 31. Line 52 affords open communication between line 33 and chamber 53 of feel cylinder 30. Line 54 affords open communication between line 34 and chamber 55 of the feel cylinder. It can be seen then that if the flow through valve 27 is throttled and a differential in pressure created on each side of piston 31 through conduits 33 and 34 the same differential in pressure will be created between chambers 53 and 55 of the feel cylinder 30 and piston 56 will tend to move. It will be noted that if an increased pressure is caused in conduit 33 by reason of valve 27 moving to the left, the feel cylinder will tend, under the same differential in pressure that moves piston 31, to move to the right, thus tending to restore valve 27 to its normal or neutral position.

From the above description it can be seen that if control column 4 is pulled to the left in Figures 1 and 2, linkage 12 will move forwardly and lever 13 will move about pivot 60 to move linkage 61 and valve rod 47 to the left. This will cause the elevator 1 to move clockwise or to a climb position. The pilot will have to hold the control column against the force generated by the differential in pressure on piston 56 of the feel cylinder, because valve 27 is so small that it offers very little resistance to movement of the control column 4. By reason of the force on the piston in the feel cylinder, the pilot is advised of the amount of aerodynamic force exerted against the control surface. It can be seen that for any predetermined motion of the control column a specific amount of force is exerted on the elevator due to a specific throttling of the fluid flow and thereby a specific amount of motion of rod 32, control horn 3, and linkage 15. If the aerodynamic resistance to motion of a control airfoil is a small amount for a certain predetermined motion of the control column, piston 31 will continue to move quite freely to the right as it is unopposed by aerodynamic forces on the elevator. This would result in over-control if it were not for the fact that follow-up linkage 15 is pivoted at 62 to follow-up lever 63 which in turn is pivotally secured to the airplane structure at pivot 64. Excessive motion, therefore, of the elevator or of linkage 15 will cause lever 63 to move about pivot 64 which results in pivot point 60 being displaced to the right which tends to restore valve 27 to a less restrictive position by moving it to the right and thereby decreasing the differential in pressure or force on piston 31 which is causing the excessive motion of the elevator. The feel experienced by the pilot in the feel cylinder will also decrease. In this way the booster cylinder exerts only enough force to counteract the aerodynamic forces on the elevator and through the linkage described, it tends to adjust the pressure in the system by reason of adjusting valve 27 to produce just enough force to balance the forces on the control surfaces. Through the feel cylinder the pilot is advised of the force required. If the pilot pulls the control column further to the left the system operates to move elevator 1 further in a clockwise direction and any excessive motion of the elevator and linkage 15 corrects the position of valve 27 to produce the proper amount of force in the cylinder to balance the forces on the control airfoil. The pilot is again advised of the increased force necessary to hold the elevator in this position by the force exerted in the feel cylinder.

Linkage 9 is actuated by rudder pedals (not shown) and the system operates in a manner similar to that described for the motion of the elevator. When the rudder pedals pull linkage 9 to the right, lever 65 turns about pivot 66 to move linkage 67 and valve rod 68 to the left which causes valve 28 to restrict the flow of fluid therethrough and cause a differential in pressure to be transmitted to piston 69 through conduits 70 and 71. Conduits 72 and 73 transmit this differential in pressure to feel cylinder 74 which react through rod 75, linkage 67, lever 65, and linkage 9 to advise the pilot of the force involved to turn the rudder. Piston 69 exerts a force through rod 76 to move control horn 8 and rudder 6. Over-control of the rudder is transmitted through linkage 20 to lever 19 which moves piston point 66 to adjust valve 28 to cause the forces in the booster cylinder to be adjusted to balance the aerodynamic forces on the rudder.

It can be seen from the above description that with this open center system, that is, with the system in which fluid flows from pump 26 through conduit 77, valve 27, conduit 78, valve 28 and return conduit 29 that the flow of fluid will be smooth and continuous. The forces in the booster cylinder are generated by merely restricting the flow in valves 27 and 28, rather than in the conventional system where fluid flow is admitted from the valve to the cylinder and abruptly cut off. This type of system in which the flow is never cut off has no tendency to chatter or exhibit what is commonly referred to as water hammer. The continuously flowing fluid through the two valves in an unrestricted fashion and the booster cylinder in open communication with the valve acts as a damper on any tendency of the control airfoil to vibrate under aerodynamic forces. It will be seen that flutter is automatically damped by this open and unrestricted booster system. If the elevator tends to flutter, motion in a clockwise direction will produce a forward motion on lever 15 which will move pivot 60 forwardly which is the equivalent of forward motion of control column 4 or a down elevator position. A slight restriction will be caused in valve 27 which will create a force in booster cylinder 5 to oppose the tendency to flutter or move in the upward direction. A similar opposition to motion through this booster system will be generated when the control airfoil moves downwardly. In other words, the booster system in the neutral position tends to maintain equilibrium in the control system and will generate forces to oppose any inadvertent motion from the equilibrium condition.

It will be obvious that the requirement of the system will have to be so calculated that the pressure at the pump 26 will be adequate to operate both the elevator and rudder at the same time. In other words, the pressure in the circuit including the reservoir, pump, conduit 77, valve 27, conduit 78, valve 28 and conduit 29 will be the sum of the pressure caused by the maximum restriction of valves 27 and 28 operating simultaneously. The total flow is always available to operate rudder and elevator either independently or together at the same speed.

While a double acting cylinder is illustrated as the hydraulic cylinder 5, it is to be understood that any hydraulic device of equivalent function is intended, such as two opposed single hydraulic cylinders.

It is to be understood that certain changes, alterations, modifications and substitutions may be made without departing from the spirit and scope of the appended claims.

I claim as my invention:

1. A booster system for the control surfaces of an aircraft including a rudder and an elevator, one hydraulic cylinder including a piston and rod for actuating said rudder and another cylinder for actuating said elevator, said booster system comprising a reservoir, a pump, and two normally open restrictor valves connected in series by conduits to form a complete fluid flow circuit through which fluid may be circulated by the pump continuously and uninterruptedly, the chambers on each side of the piston in each hydraulic cylinder being in constant fluid communication with said fluid circuit, said chambers connected to the circuit on each side of a restrictor valve, control means to actuate each said valve to variably restrict the flow of fluid therethrough without interrupting the flow of fluid in said circuit, so that a correspondingly variable differential in pressure will be created in the circuit on each side of the restrictor valve to actuate said piston in said cylinder.

2. A booster system for the controls of an aircraft including a rudder and an elevator, one hydraulic cylinder for actuating said rudder and another cylinder for actuating said elevator, said booster system comprising a reservoir, a pump, and two normally open restrictor valves connected in series by conduits to form a complete fluid flow circuit through which fluid may be circulated by the pump continuously and uninterruptedly, each of said valves being connected respectively to one of said hydraulic cylinders, means in said valves to variably restrict the flow therethrough to cause a corresponding differential in pressure in the valve, each of the hydraulic cylinders being in constant fluid communication with said circuit at its associated valve whereby the differential in pressure produced at the associated valve serves to actuate said cylinder.

3. A booster system for the rudder and elevator of an aircraft comprising one hydraulic cylinder for actuating the rudder and another for actuating the elevator, two valves, one connected to each cylinder to control fluid pressure thereto, said valves being connected in a circuit in series with a reservoir, a pump, supply line and a return line so that fluid will flow continuously and uninterruptedly in said circuit, each valve having an internal member so constructed and arranged that in neutral position the flow of fluid will be substantially unrestricted between the inlet and outlet ports of said valve, said internal member being movable from neutral position to variably restrict said flow to create a corresponding differential in pressure in that portion of the circuit within the valve, fluid lines in constant communication with said circuit for transmitting the differential in pressure on each side of said valve to one of said hydraulic cylinders, and pilot operated means to actuate each of said valves to cause a differential in pressure to be created in said circuit to actuate either or both hydraulic cylinders.

4. A booster system for the control surfaces of an aircraft including a rudder and an elevator, one hydraulic cylinder including a piston and rod for actuating said rudder and another cylinder for actuating said elevator, said booster system comprising a reservoir, a pump, and two restrictor valves connected in series by conduits to form a complete fluid flow circuit through which fluid may be circulated by the pump continuously and uninterruptedly, the chambers on each side of the piston in each hydraulic cylinder being in constant fluid communication with said fluid circuit, said chambers connected to the circuit on each side of the restrictor in one of said restrictor valves, pilot operated control means to actuate each of said valves to variably restrict the flow of fluid therethrough without interrupting the flow of fluid in said circuit, so that a corresponding differential in pressure will be created in the circuit on each side of the restrictor valve to actuate said piston in said cylinder connected thereto, a feel cylinder having a piston and rod, said rod being connected to said valve actuating means to move therewith, said feel cylinder being connected on each side of said valve so that the differential in pressure created by actuation of said valve will be transmitted to said feel cylinder, said feel cylinder being connected so that the force created therein by the differential in pressure around the valve will tend to restore the valve to the neutral position and also oppose the force exerted by the pilot.

5. A booster system for the controls of an aircraft including a rudder and an elevator, one hydraulic cylinder for actuating said rudder and another cylinder for actuating said elevator, said booster system comprising a reservoir, a pump, and two restrictor valves connected in series by conduits to form a complete fluid flow circuit through which fluid may be circulated by the pump continuously and uninterruptedly, each of said valves being connected to one of said hydraulic cylinders, means in said valves to variably restrict the flow therethrough to cause a differential in pressure in the valve, said corresponding differential in pressure being used to actuate said hydraulic cylinders, manual control means for actuating said restricting means, and follow-up mechanism interposed between said manual control means and said restricting means and responsive to actuation of said cylinders to reversely actuate said restricting means, the inlet and outlet to said hydraulic cylinders being in open communication with the fluid flow in the system at all times, so that any tendency to flutter is damped by the hydraulic cylinders but displacement of the rudders and elevators by said manual control is unimpeded by said hydraulic system.

6. A booster system for a control surface of an aircraft comprising a control airfoil, a hydraulic cylinder including a piston and rod for actuating said control airfoil, said booster system comprising a reservoir, a pump and a restrictor valve connected in series by conduits to form a complete fluid flow circuit through which fluid may be circulated by the pump continuously and uninterruptedly, the chambers on each side of the piston in the hydraulic cylinder being in constant communication with said fluid circuit, said chambers connected to the circuit on each side of said restrictor valve, control means to actuate said valve to variably restrict the flow of fluid therethrough without interrupting the flow of fluid in said circuit, so that a corresponding differential in pressure will be created in the circuit on each side of said restrictor valve to actuate said piston in said cylinder, a manual control to so actuate said valve control means, and a feel cylinder hydraulically connected to said valve to be actuated by the differential in pressure created by said valve, said feel cylinder mechanically connected to said valve control means and said manual control to oppose the force exerted on the manual control and tend to restore the valve to the neutral position, said control means including follow-up mechanism responsive to actuation of said first mentioned cylinder to reversely actuate said valve.

7. A booster system for a control airfoil of an aircraft comprising a hydraulic cylinder for actuating said control airfoil, a valve connected to said cylinder to control fluid pressure thereto, said valve being connected in a circuit in series with a reservoir, a pump, supply line and a return line so that fluid will flow continuously and uninterruptedly in said circuit, said valve having an internal member so constructed and arranged that in neutral position the flow of fluid will be substantially unrestricted between the inlet and outlet ports of said valve, said internal member being movable from neutral position to variably restrict the flow of fluid between said ports to create a corresponding differential in pressure in that portion of the circuit within the valve, fluid lines in constant communication with said circuit for transmitting the differential in pressure on each sde of said valve to said hydraulic cylinder, means to actuate said internal member to cause a differential in pressure to be created in said line to actuate said hydraulic cylinder and said control airfoil, and lever means interconnecting said control actuating means and said valve and connected to said control airfoil so that motion of the control airfoil caused by air loads will move said lever means to actuate said valve to cause a differential in pressure to be applied to the hydraulic cylinder that will tend to oppose movement of the airfoil by the airstream.

8. A booster system for the controls of an aircraft including a plurality of control airfoils, a hydraulic cylinder for actuating each of said control airfoils, said booster system comprising a reservoir, a pump, and a plurality of restricter valves connected in series by conduits to form a complete fluid flow circuit through which fluid may be circulated by the pump continuously and uninterruptedly, each of said valves being connected to one of said hydraulic cylinders, means in said valves to variably restrict the flow therethrough to cause a corresponding differential in pressure in the valve, said differential in pressure being used to actuate said hydraulic cylinders, manual control means for actuating said restricting means, and follow-up mechanism interposed between said manual control means and said restricting means and responsive to actuation of said cylinder to reversely actuate said restricting means, the inlet and outlet to said hydraulic cylinders being in open communication with the fluid flow in the system at all times, so that any tendency of an airfoil to flutter is damped by the hydraulic cylinders but the displacement of the control airfoil by said manual control is unimpeded by said hydraulic systems.

THOMAS C. HILL.

(References on following page)

REFERENCES CITED

The following references are of record in the file of this patent:

UNITED STATES PATENTS

| Number | Name | Date |
|---|---|---|
| 1,373,568 | Paine | Apr. 5, 1921 |
| 1,516,164 | Vickers et al. | Nov. 18, 1924 |
| 2,065,219 | Ferris | Dec. 22, 1936 |
| 2,114,157 | Towson | Apr. 12, 1938 |
| 2,134,399 | Dawson | Oct. 25, 1938 |
| 2,188,334 | Fischel et al. | Jan. 30, 1940 |
| 2,224,725 | Felt | Dec. 10, 1940 |
| 2,278,557 | Overbeke | Apr. 7, 1942 |
| 2,345,531 | De Ganahl | Mar. 28, 1944 |
| 2,366,382 | Burton et al. | Jan. 2, 1945 |
| 2,378,829 | Carlson | June 19, 1945 |
| 2,389,274 | Pearsall et al. | Nov. 20, 1945 |